United States Patent

Friedman et al.

[15] 3,693,066
[45] Sept. 19, 1972

[54] NATURAL FEELING COMMON DRIVE PLOTTER-DIGITIZER

[72] Inventors: David Friedman; Kenneth Levy, both of Framingham, Mass.

[73] Assignee: Computervision Corporation, Burlington, Mass.

[22] Filed: Aug. 24, 1970

[21] Appl. No.: 66,343

[52] U.S. Cl. .................................318/576, 318/628
[51] Int. Cl. ......................G05b 11/36, G05b 11/01
[58] Field of Search.......318/576, 577, 578, 579, 628

[56] References Cited

UNITED STATES PATENTS

| | | | |
|---|---|---|---|
| 2,410,599 | 11/1946 | Conklin | 318/628 |
| 3,449,742 | 6/1969 | Stapleton | 318/578 X |
| 3,467,899 | 9/1969 | Inaba et al. | 318/578 |
| 3,481,577 | 12/1969 | Fling | 318/578 X |
| 2,851,643 | 9/1958 | Limberger | 318/577 |
| 3,024,396 | 3/1962 | Peckjian | 318/578 X |
| 3,060,332 | 10/1962 | Anderson et al. | 318/576 X |
| 3,328,801 | 6/1967 | Boyle et al. | 318/576 X |
| 2,414,102 | 1/1947 | Hull et al. | 318/628 X |

Primary Examiner—T. E. Lynch
Attorney—Chittick, Pfund, Burch, Samuels & Gauthier

[57] ABSTRACT

A power assisted positioning device which provides a natural feeling common drive for a plotter-digitizer. The plotter-digitizer comprises a movable arm positioned over a drawing surface and driven by servo motors under the control of a transducer mounted on the arm. The arm holds an engageable drawing tool and a measuring reticle. Control circuitry translates force on the transducer into rate-of-arm motion in the direction of the force. The moving force for the arm is normally supplied by the operator through his hand. Additional features of this invention include a deadband around the zero force point and a high mechanical resonant frequency characteristic in the transducer. These characteristics result in a "natural feel" to the hand controlled arm and provide high stability to the system. Motion of the arm can be in tiny steps of accurately known size and a record of the steps can be stored to indicate the direction and amount of arm travel. Likewise, on command from a control such as a computer, the arm can be moved a selected number of steps representative of a desired travel, using some of the same control circuitry.

17 Claims, 3 Drawing Figures

INVENTOR
DAVID FRIEDMAN
KENNETH LEVY
BY
Chittick, Pfund, Birch, Samuels & Gauthier
ATTORNEYS

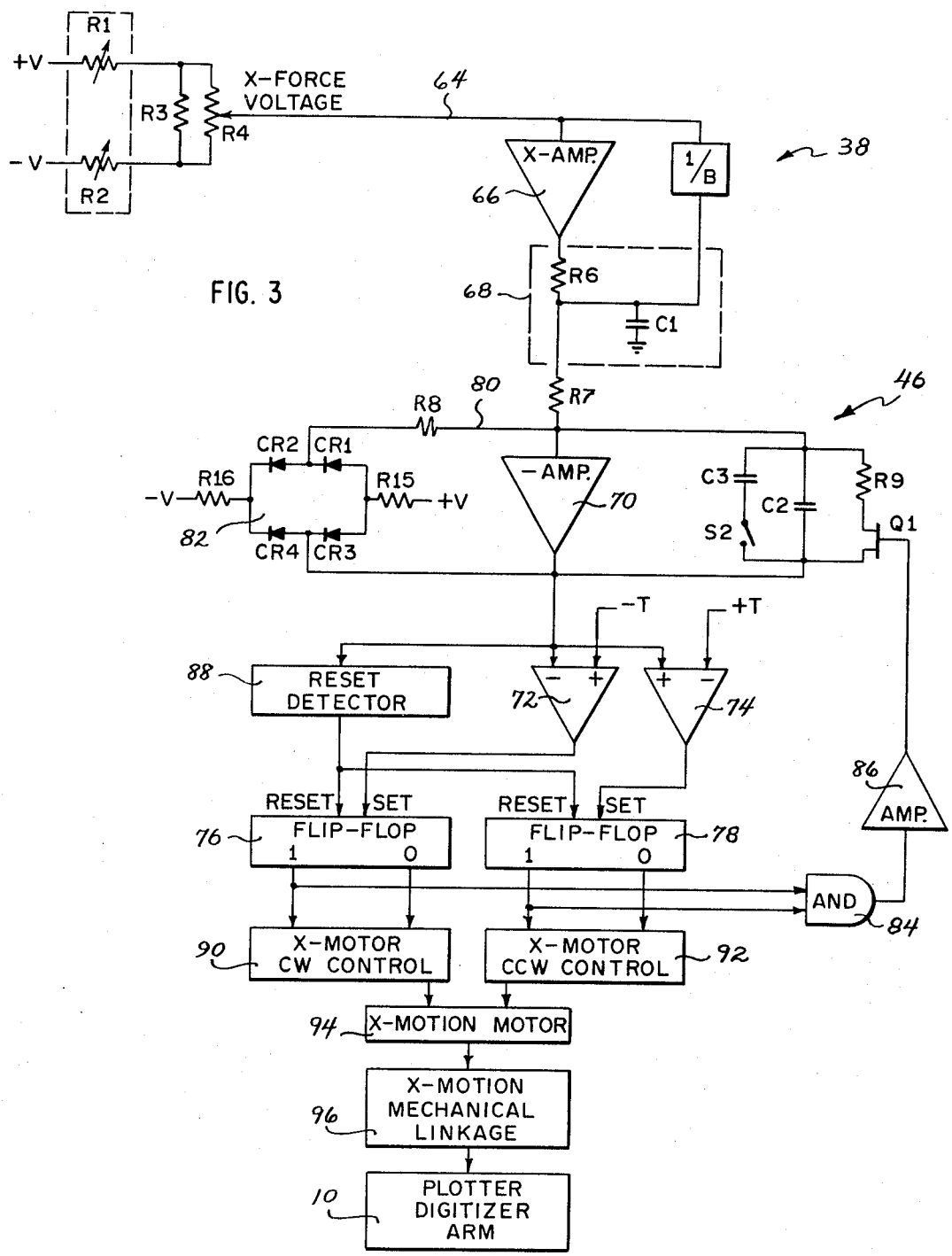

NATURAL FEELING COMMON DRIVE PLOTTER-DIGITIZER

RELATED APPLICATIONS

This application is copending with the application of David Friedman and Kenneth Levy for SIGNAL LEVEL-TO-PULSE RATE CONVERTER filed of even date herewith and assigned to the same assignee.

BRIEF DESCRIPTION OF THE INVENTION

The functions of generating digital information from a drawing or model (digitizing) and of creating a new or upgraded shape from that or other digital data (plotting) are accomplished in a novel manner which gives improved performance. Previously, this operation was accomplished by heavier, bulkier and more expensive equipment. Representatives of the prior art are:

1. Designs using separate digitizing and plotting mechanisms which add cost and complexity to the system;
2. Systems with remote control optical scanners for digitizing and plotting which require the operator to work remotely from the drawing operation and which diminish his feel for the work; and,
3. Systems with plotters and digitizers driven by error signals from a measurement position which suffer from stability and cost disadvantages.

It is therefore a general object of the present invention to provide a plotter-digitizer which gives the operator a "natural feel" when controlling the plotter-digitizer arm manually for digitizing.

It is a specific object of the invention to provide a simple and accurate means for digitizing graphic information which can also be used for plotting from digital information in the same form.

It is another object of the invention to provide common elements for the digitizing and plotting functions which are stable when used to digitize.

It is still another object of the invention to provide these advantages in a plotter-digitizer at a low manufacturing cost using many of the same components for both the plotting and digitizing functions.

These and other objects of the invention are achieved in the preferred embodiment of the present invention by means of a single movable arm that is positioned relative to a model or a drawing surface by a drive means. The The rate of arm movement is proportional to the amount of force applied. A suitable drawing tool is secured to the arm and engaged with the drawing surface on command. Alignment of the drawing tool with the desired position on the model or drawing surface is accomplished by sighting through an arm mounted reticle.

The transducer mounted on the arm converts the applies force in any of the possible directions of arm motion into a proportional voltage. Voltage-to-pulse conversion circuitry then generates pulses at a rate representative of the voltage. A dead-band of no pulses around the zero force position insures that the arm will have a definite rest state including the hands-off condition, the pulses being generated at a rate proportional to the amount by which the transducer outputs exceeds the dead-band. Filtration in the conversion circuitry prevents pulse rate changes beyond the motor's response capability while at the same time insuring that the fastest possible response times will be achieved for even small changes.

Movement of the arm is effected by the drive means through mechanical linkages between the arm and stepping motors. The motor shaft rotation or linear displacement is quantized into elements of digital information. The stepping motors rotate or displace one step for each pulse generated by the voltage controlled pulse generators. When the operator moves the arm, the exact arm movement, as represented by motor shaft motion, is registered in digital form. The accuracy of the digital information is independent of all elements in the control loop except the motor-to-arm mechanical linkage.

When a plot is ordered by a computer or other control electronics connected to the plotter-digitizer, the plotting commands can be translated by the computer directly into the stepping motor actuating pulses. The pulses generated in this fashion are fed directly into the plotter-digitizer at the output of the pulse generator to produce the arm motion necessary to trace out the plot.

To secure further the stability of the arm, the movable portion of the transducer is designed to have a very high resonant frequency. This prevents oscillation in the control loop by mechanically filtering out all lower frequencies at which the arm is capable of vibrating.

The objects and features of the present invention will best be understood from a detailed description of a preferred embodiment of the invention, selected for purposes of illustration and shown in the accompanying drawings in which.

DETAILED DESCRIPTION OF THE PREFERRED EMBODIMENT

Figure 1:
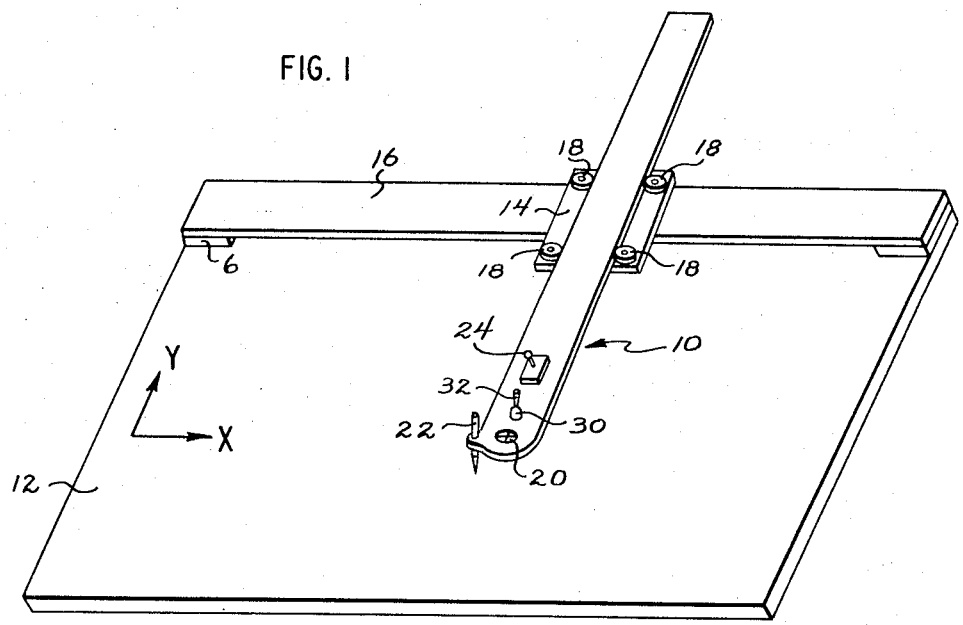
FIG. 1 is a perspective view of a drawing surface with a relatively movable plotter-digitizer arm mounted thereon.

Turning now to the drawings and particularly to FIG. 1 thereof, there is shown in perspective view, a plotter-digitizer arm 10 which is positioned above and relatively movable with respect to a drawing surface 12. Relative movement of the arm 10 is provided by a carriage 14 and traveller bar 16 which together permit the arm to move in both of two orthogonal directions, X and Y, over the surface 12. In a manner known in the art, four rollers 18 are pivotally mounted through their centers on the top surface of the carriage 14. Two rollers 18 are located on each side of the arm and hold the arm securely except to allow sliding motion of the arm in the Y direction. A similar set of rollers, not shown, on the underside of the carriage permit the carriage to slide along the traveller bar 16 in the X direction while resisting all other motions between the carriage and bar. Through cooperation between these two motions, an arm mounted reticle 20 can be positioned over any selected point on the surface 12. A suitable drawing tool, such as, a pen 22 is attached to the arm near the reticle, and a switch 24 is provided on the arm or elsewhere to engage or disengage the pen with the surface 12 using techniques known in the art.

The above described arm motion mechanism is old in the art and only presented to exemplify the operation of the present invention. Any other device capable of supporting an arm for motion in different directions can be substituted. Furthermore, the driven arm concept of the present invention also can be used to accurately position other articles and tools, such as, a drill relative to a surface or work piece.

Figure 2:
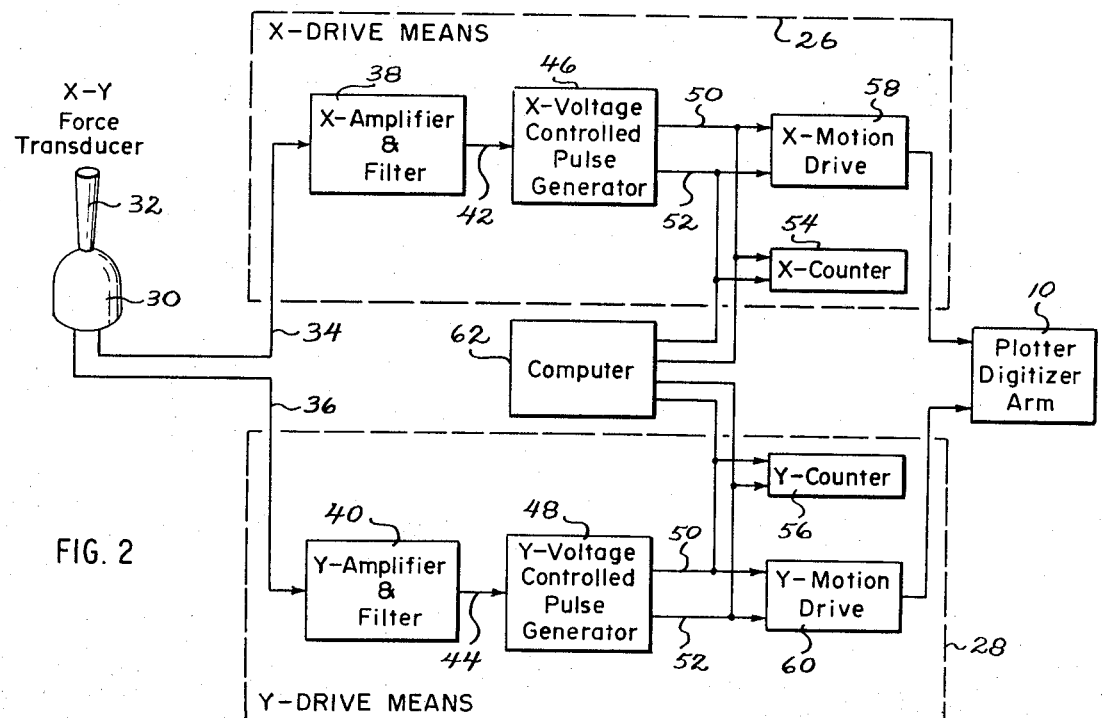
FIG. 2 is a block diagram of drive means circuitry for producing X and Y motion of the plotter-digitizer arm shown in FIG. 1; and, FIG. 3 is a block diagram and partial schematic of the drive means circuitry for producing motion of the arm in one dimension.

FIG. 2 is a block diagram of X and Y channel drive means 26 and 28, respectively. An X-Y force transducer 30 mounted on arm 10 produces an electrical output signal representative of the deflection of a transducer mounted toggle 32. The toggle 32 is resiliently constrained about the point of zero deflection. Any output signal from the transducer is thus representative of a force deflecting the toggle 32. The electrical output signal from the transducer is applied to the X and Y drive means through respective input lines 34 and 36. Line 34 feeds an X amplifier-filter 38, while line 36 feeds a corresponding Y amplifier-filter 40. Each amplifier-filter combination boosts the transducer voltage output and low-pass filters it to establish a maximum rate of change of the output of the amplifier and filter on lines 42 and 44. X and Y voltage controlled pulse generators 46 and 48 produce signals at a rate proportional to the voltage level on lines 42 and 44, respectively. For voltages within a dead-band around zero on lines 42 and 44 no pulses are generated. For greater positive levels, pulses appear on output lines 50. For greater negative levels, they appear on lines 52.

Computation electronics is shown in the form of X and Y counters 54 and 56 to record the difference in the number of X and Y pulses on lines 50 and 52. X and Y motion drives 58 and 60 respond to these pulse signals and produce X and Y motion of arm 10 through pulse motors which advance one step for each pulse. Line 50 pulses produce positive X and Y motions and line 52 pulses produce negative X and Y motions. To prevent oscillations in this closed-loop system, the transducer mounted toggle 32 is made light enough so that it cannot be shaken from its center position by any motion of the arm within the physical movement limits of the arm. This feature insures that the transducer 30 will give no output of its own when there is no force applied to the toggle 32 by the operator. In this way, the toggle 32 acts as a mechanical filter eliminating instability in the plotter-digitizer system when in the digitizing mode.

In addition to producing arm motions, the pulses of lines 50 and 52 are fed to a computer 62. The computer can be any type of general or special purpose computer or digital circuit programmed to store and/or analyze the pulses generated as arm 10 is moved by the operator. Computer 62, in response to a program command, can generate pulses itself which are fed to the X and Y motion drives 58 and 60 causing them to produce arm motion and selectively engage pen 22. It is thereby possible for the operator to make a drawing by driving the arm over the surface 12 and then let the computer analyze it according to certain standards in a program and reproduce an upgraded drawing.

FIG. 3 is a detailed schematic of the drive means for one direction of motion, in this case X motion. Identical components are used for the Y drive means or for any other direction of motion.

The transducer 30 can be any device which produces an electrical output representative of a force applied to it. Superior results are obtained when the transducer is of the strain gauge type, such as Measurement Systems Model 465.

The portion of the strain gauge type of transducer involved in X motion comprises resistors R1 and R2 shown in FIG. 3. They vary in a conventional manner in response to a strain on them in a single direction. The strain in the plotter-digitizer of the present invention is produced by deflection of toggle 32 in the X direction. Each resistor is biased as shown with positive and negative voltages respectively on one end and joined through adjusting resistors R3 and R4 at the other end. A tap on R4 connected to line 64 can be adjusted for the zero voltage point on R4 when there is no force on toggle 32 in the X direction. Displacement of the toggle 32 produces a voltage on line 64 of magnitude and polarity proportional to the amount and polarity of the force on the toggle.

The voltage on line 64 from the X deflection force on toggle 32 is amplified by amplifier 66 and filtered by filter 68. The filter 68 limits the maximum rate of voltage change at its output for large instantaneous voltage excursions at the amplifier output. Smaller voltage excursions on line 64 are followed by the filter output at this same maximum rate. This function is achieved by placing a low-pass filter, in this case an R-C filter composed of resistance R6 and capacitance C1, on the output of amplifier 66. A slow response circuit such as an integrator could be used in place of the R-C filter. Negative feedback is taken from the junction of resistor R6 and capacitor C1 through transfer function 1/B to the input of amplifier 66. Transfer function 1/B is typically a resistor and an amplifier having a gain which insures that the feedback will be negative. Amplifier 66 has a very high open-loop gain which causes saturation of the output for only small inputs on line 64. The R6-C1 filter combination is adjusted to give the maximum allowable rate of voltage change or slope limit on line 42 (FIG. 2) for a voltage step at the output of amplifier 66 equal to the voltage change between positive and negative amplifier output saturation levels. By placing filter 68 in the feedback loop, the feedback response no faster than the voltage across capacitor C1 and the amplifier still saturates for even small but rapid changes at the input. This assures that the amplifier will respond at maximum rate to rapid input changes regardless of whether the input change is small or large. This maximum rate is established by the response capabilities of the pulse motors selected for the X and Y drive means 58 and 60, respectively.

The amplifier-filter combination 38 can be made to operate as a normal gain in series with a low-pass filter by making the transfer function 1/B an open circuit and reducing the gain of amplifier 66. Operating in this manner, the ability to follow the maximum slope for all abrupt input changes is lost. The feel which results in the digitizing operations from this filter arrangement, however, may be preferable to some operators.

The feel which results from either amplifier-filter combination 38, that is with or without the presence of the transfer function 1/B, is a very subjective sensation. Briefly, the amplifier-filter combination 38 with the transfer function 1/B minimizes the sensation of inertia or mass in driving the arm 10 through the toggle 32 making it feel light and responsive but rigid. With the transfer function 1/B open circuited there is a greater sensation of mass and inertia when the arm 10 is driven in digitizing with the toggle 32.

Voltage controlled pulse generator 46 responds to the voltage across capacitor C1 to generate a pulse rate representative of that voltage. The voltage controlled pulse generator comprises an amplifier 70 operating as an integrator with respect to time by having negative feedback through capacitor C2 and a resistor R7 in series with the input. When the integral of the voltage input reaches a positive or negative threshold level, a pulse of constant height and duration is produced through the cooperation of comparators 72 and 74 and flip-flops 76 and 78. At the same instant, the output of amplifier 70 is reset to nearly zero volts by discharging feedback capacitor C2 through field-effect transistor Q1 and resistor R9 connected in parallel with capacitor C2. The amplifier 70 is then ready to perform another integration By adjusting the values of R7 and C2 according to known formulae, the rate of integration and hence pulse rate can be adjusted for a given voltage on line 42 (FIG. 2). An additional capacitor C3 can be switched in across C1 by switch S2 to generate pulses at a lower rate for slow arm motion when trying to align the arm with a precise point on surface 12. This accomplishes a reduction in gain for the overall drive means. Any other attenuation means could be used, but the advantage of using an additional capacitor is that the dead-band stays the same.

To prevent the generation of pulses caused by input drift in amplifier 70, a path 80 of current limited negative d.c. feedback is provided between the output and the negating input of amplifier 70 for low values of input voltage only. Thus, for small inputs the amplifier operates as a normal d.c. amplifier. This provides a dead-band around the zero force condition assuring that no pulses are generated when toggle 32 is not deflected. As the input and output of amplifier 70 increases, the current of the d.c. feedback path 80 is limited so that the amplifier begins to integrate excess input currents.

This function is accomplished by diode bridge 82 in feedback path 80. The diode bridge is composed of two rectifying series each containing two rectifying elements or diodes. Diodes CR1 and CR2 form one series while CR3 and CR4 form the other series. Both rectifying series are connected in parallel between resistors R15 and R16. The other terminals of these resistors are connected to positive and negative potentials +V and −V respectively. All diodes are oriented for conduction between these two potentials. The output of amplifier 70 is connected to the junction of the diodes CR3 and CR4 within one series, and the negating input of the amplifier 70 is connected to the junction between the diodes CR1 and CR2 within the other series through feedback impedance R8. The resistance of R8 is selected to be smaller than the individual resistances of R15 and R16. For the zero output condition of amplifier 70 all four diodes conduct current between the +V and −V potentials.

As the output of amplifier 70 increases positively, CR3 conducts less and CR4 conducts more taking the current from the amplifier output while resistor R15 conducts less and resistor R16 conducts more. This current flow configuration produces a voltage shift for the entire diode bridge in the positive direction and a concomitant current flow through feedback impedance R8, from the junction of CR1 and CR2 into the negating input of amplifier 70 thereby establishing a negative d.c. feedback. As the output of amplifier 70 further increases positively, CR3 will eventually become back-biased because the voltage at the junction between CR1 and R15 cannot rise above the level defined by the current which CR1 is able to conduct to R8. CR2 will be back-biased due to the increasing voltage at the junction of R16 and CR4 caused by the increase in current through CR4. When CR3 and CR2 are backed-biased, the d.c. feedback path is interrupted with the feedback limited to the current which R15 can conduct to R8. At this point amplifier 70 begins to integrate the excess input which is not balanced by the limited feedback. The integration rate begins at zero and increases smoothly proportional to the excess in the input to amplifier 70.

From the symmetry of the diode bridge 82 in the feedback path 80, it can be seen that the same process occurs for negative outputs from amplifier 70. For small negative outputs the d.c. feedback path is maintained, but for larger negative voltages diodes CR4 and CR1 become back-biased, limiting the feedback path and permitting integration to proceed. Thus by adjusting V, R15, R16 and/or R8, the range of outputs of amplifier 70 which produce d.c. feedback can be controlled.

The output of amplifier 70 is fed to comparators 72 and 74. These are amplifiers operating in a conventional manner to change from one saturation level to another at their output very rapidly as the input level passes from one side of the level established by threshold voltage references +T and −T to the other. The comparators thus function as threshold detectors. The outputs of comparators 72 and 74 are connected to the SET inputs of bistable flip-flops 76 and 78, respectively. The 1 outputs of these flip-flops feed an AND gate 84 whose output feeds a field-effect transistor Q1 through amplifier 86. FET Q1 is in series with R9 across the integrating capacitor C2. In operation comparator 74 changes its output when the output from amplifier 70 passes through the positive threshold level +T and comparator 72 does the same for negative outputs of the amplifier. The change in comparator 74 output corresponding to the amplifier's output reaching the +T level results in a SET input to flip-flop 78. Similarly, a negative threshold output from amplifier 70 produces a SET input on flip-flop 76. Either a +T or −T occurrence at the output of amplifier 70 changes the output of one of the flip-flops and resultingly the output of the AND gate 84. The change of state in the output of AND gate 84 causes field-effect transistor Q1 to conduct and discharge capacitor C2 through resistor R9 thereby resetting the output of amplifier 70 to near zero.

When this near zero voltage is detected by a reset detector 88 which is connected to the output of amplifier 70, a reset signal is produced by the reset detector and applied to the RESET inputs of flip-flops 76 and 78. Which ever flip-flop was originally set by comparators 72 and 74 on the occurrence of the positive or negative threshold level at the output of amplifier 70 is reset after the integrating capacitor has been discharged by conduction of FET Q1. The other flip-flop was not changed by the output of amplifier 70 and therefore the reset signal has no effect on it. A pulse of well defined amplitude and duration is produced by flip-flop 78 when the amplifier 70 output reaches the positive threshold and by flip-flop 76 when the negative threshold occurs.

These pulses are fed to standard control circuitry 90 and 92 for controlling a conventional pulse motor 94 which drives the plotter-digitizer arm 10 in the X direction through mechanical linkages 96. More specifically, the pulse output of flip-flop 76 produces clockwise rotation of the pulse motion 94 through X-motor CW control 90 while the output of flip-flop 78 produces counterclockwise rotation of the motor through X-motor CCW control 92. Motor 94 and linkages 96 cooperate in a well known manner to produce X-motion of the plotter-digitizer arm 10.

It will be appreciated that it is equally possible to use pulse motors which produce a shaft motion other than rotational. For example linear motion could be generated by the pulse motor 94. Control 90 would then produce motion in one direction for pulse motor 94 from pulses out of flip-flop 76 while control 92 produced opposite motion for the same motor from pulses out of flip-flop 78.

In operation, a force on toggle 32 in either or both the X and Y directions produces a voltage change on either or both of the X and Y voltage outputs of transducer 30 mounted on the plotter-digitizer arm 10. The voltage output is amplified and filtered at 14 and 15 to limit the voltage slope to the maximum acceleration capability of the pulse motors which position the arm 10 in the X and Y direction. However, a maximum response is obtained for all rapid voltage changes regardless of the magnitude of the change. The amplified and filtered voltage is then integrated when the voltage is above or below a predetermined dead-band surrounding the no force level. For filtered voltages within the dead-band there is no integration. When the integrator has reached either a positive or negative threshold voltage level, the integrator is reset to near zero output and a pulse is produced which advances the motors positioning arm 10. The motors advance a rotational step clockwise or counterclockwise for each pulse depending on whether the integration reached the positive or negative threshold level. Mechanical linkages translate the motors' rotation into X and Y motion of arm 10 in the direction of the force applied to toggle 32. A continuous train of pulses produce arm motion at a rate proportional to the force applied. Thus an operator can power drive or steer arm 10 to any spot on surface 12.

Having described in detail a preferred embodiment of my invention, what I desire to claim and secure by Letters Patent of the United States is:

1. A plotter-digitizer comprising:
   a. movable arm means mounted for movement along at least one dimension relative to a surface;
   b. manually actuated force sensitive transducer means mounted on said arm for producing an output signal for each dimension of movement representative of the force applied to it along that dimension of movement;
   c. means for developing an intermediate signal from each output signal of said transducer means representative of the force applied to the transducer along the corresponding dimension of movement;
   d. computer means
      i. responsive to said intermediate signal for data processing said intermediate signal and,
      ii. for generating a plotting signal;
   e. arm drive means responsive
      i. to each intermediate signal for driving the arm along the dimension of movement corresponding to the applied force which produced the transducer means output signal, and,
      ii. to said plotting signal for driving the arm along a predetermined dimension of movement; and,
   f. means for selectively applying said intermediate and plotting signals to said arm drive means.

2. The positioner of claim 1 further characterized by said transducer having a natural frequency of mechanical vibrations which is high with respect to the possible frequencies of oscillation of said positioner arm means.

3. A plotter-digitizer comprising:
   a. movable arm means mounted for movement along at least one dimension relative to a surface;
   b. manually activated force sensitive transducer means mounted on said arm for producing an output signal for each dimension of movement representative of the force applied to it along that dimension of movement;
   c. means for developing an intermediate signal from each output signal of said transducer means representative of the force applied to the transducer means along the corresponding dimension of movement;
   d. computer means
      i. responsive to said intermediate signal for data processing said intermediate signal; and,
      ii. for generating a plotting signal;
   e. arm drive means responsive
      i. to said plotting signal for driving the arm along a predetermined dimension of movement and,
      ii. to each intermediate signal for driving the arm along the dimension of movement corresponding to the applied force which produced the transducer means output signal and at a rate representative of the excess of that force over a dead-band;
   f. means for producing said dead-band in the response of said arm drive means surrounding the zero force condition of said transducer means wherein each of said drive means provides no arm drive in response to forces on said transducer means within said dead-band; and,
   g. means for selectively applying said intermediate and plotting signals to said arm drive means.

4. The positioner of claim 3 further characterized by said transducer having a natural frequency of mechanical vibration which is high with respect to the possible frequencies of oscillation of said positioner arm means.

5. A positioner comprising:
   a. movable arm means mounted for movement long at least one dimension relative to a surface;
   b. manually activated force sensitive transducer means mounted on said arm for producing an output signal for each dimension of movement representative of the force applied to it along that dimension of movement;

c. means for developing an intermediate signal from each output signal of said transducer means representative of the force applied to the transducer along the corresponding dimension of movement;

d. arm drive means responsive to each intermediate signal for driving the arm along the dimension of movement corresponding to the applied force which produced the transducer output signal; and, e. computer means for generating a plotting signal for use by said arm drive means to produce arm motion, said plotting signal selectively substituting for said intermediate signal in said arm drive means.

6. The positioner of claim 5 wherein said computer means is further adapted to respond to said intermediate signal for data processing of said intermediate signal.

7. A positioner comprising:
a. movable arm means mounted for movement along at least one dimension relative to a surface;
b. manually activated force sensitive transducer means mounted on said arm for producing an electrical output for each dimension of movement representative of the polarity and magnitude of the force applied to it along that dimension of movement;
c. filter means responsive to each output of said transducer means for slope limiting each of said outputs;
d. means for developing an intermediate signal from the output of said filter means;
e. incremental drive means responsive to said intermediate signal for incrementally driving said arm along the dimension of movement corresponding to the applied force producing that output; and,
f. computer means for generating a plotting signal for use by said incremental drive means to produce incremental arm motion, said plotting signal selectively substituting for said intermediate signal in said incremental drive means.

8. The positioner of claim 7 further characterized by counter means for counting each incremental driving movement of said arm along the dimension of movement corresponding to the applied force producing that output.

9. The positioner of claim 7 further characterized by means for producing a dead-band in the response of said incremental drive means surrounding the zero force condition of said transducer wherein each of said incremental drive means provides no arm drive in response to forces on said transducer within said dead-band.

10. The positioner of claim 7 further characterized by said transducer having a natural frequency of mechanical vibration which is high with respect to the possible frequencies of oscillation of said positioner arm means.

11. a positioner comprising:
a. movable arm means mounted for movement along at least one dimension relative to a surface;
b. manually activated force sensitive transducer means mounted on said arm for producing an electrical output for each dimension of movement representative of the polarity and magnitude of the force applied to it along that dimension of movement;
c. an amplifier having gain between its input and output terminals, the output of said transducer means being connected to the input of said amplifier;
d. a low-pass filter having an input and output, the output of said amplifier being connected to the input of said low-pass filter;
e. a path of negative feedback between the output of said low-pass filter and the input of said amplifier; and,
f. incremental drive means connected to the output of said low-pass filter and responsive thereto for incrementally driving said arm along the dimension of movement corresponding to the applied force producing that output.

12. A positioner comprising:
a. movable arm means mounted for movement along at least one dimension relative to a surface;
b. manually activated force sensitive transducer means mounted on said arm for producing an electrical output for each dimension of movement representative of the polarity and magnitude of the force applied to it along that dimension of movement;
c. voltage controlled pulse generator means for producing pulses representative of the level and polarity of the voltage output of said transducer, said pulse generator means having:
  i. an integrator producing at its output an integration with respect to time of its input voltages and having as its input the signal fed to said pulse generator means; and,
  ii. threshold means responsive to the magnitude and polarity of said integrator's output exceeding a predetermined threshold magnitude for that polarity to generate a pulse representative of that polarity and reset said integrator so that its output magnitude is below the threshold magnitude for that polarity.
d. pulse motor means responsive to the output of said pulse generator means for producing movement in steps, the rate and direction of which are representative of the level and polarity, respectively, of the voltage output of said transducer means; and,
e. mechanical linkage means for translating the movement produced by said motor means into motion of said arm.

13. A positioner comprising:
a. movable arm means mounted for movement along at least one dimension relative to a surface;
b. manually activated force sensitive transducer means mounted on said arm for producing an output for each dimension of movement representative of the force applied to it along that dimension of movement;
c. means responsive to each output of said transducer means for driving said arm along the dimension of movement corresponding to the applied force producing that output;
d. a measuring reticle on said movable arm means; and, e. a writing tool on said movable arm means, said writing tool being selectively engageable with the surface for marking and plotting.

14. A positioner comprising:
a. movable arm means mounted for power assisted movement along at least one dimension relative to a surface;
b. manually activated transducer means mounted on said arm for generating an output for each dimension of movement representative of a force applied to said transducer means along that dimension of movement, said transducer means having a natural frequency of mechanical vibrations which is high with respect to the possible frequencies of oscillation of said arm;
c. quantizing means for each dimension of movement for generating a unit of electrical energy repetitively at a rate representative of the output of said transducer means for that dimension of movement, said quantizing means including a limiter which establishes a maximum rate of change for the change of repetition of electrical energy units generated; and,
d. a motion drive which produces from the unit of electrical energy a unit of arm movement along the dimension of movement corresponding to the transducer means output controlling the generation of the electrical energy unit.

15. A positioner comprising:
a. movable arm means mounted for power assisted movement along at least one dimension relative to a surface;
b. manually activated transducer means mounted on said arm for generating an output for each dimension of movement representative of a force applied to said transducer means along that dimension of movement, said transducer means having a natural frequency of mechanical vibrations which is high with respect to the possible frequencies of oscillation of said arm;
c. quantizing means for each dimension of movement for generating a unit of electrical energy repetitively at a rate representative of the output of said transducer means for that dimension of movement;
d. a motion drive which produces from the unit of electrical energy a unit of arm movement along the dimension of movement corresponding to the transducer means output controlling the generation of the electrical energy unit; and,
e. computer means interconnected with the quantizing means of said positioner to receive the units of electrical energy for analyzing them and for transmitting further units to said motion drive for producing arm motion.

16. The positioner of claim 14 wherein said motion drive further comprises:
a. pulse motor means for each dimension of movement;
b. linkage means for converting motion produced by said motor into movement of said arm along the dimension of movement corresponding to the dimension of movement of said motor; and,
c. controller means for producing a unit of movement of said motor for each unit of electrical energy produced by said quantizing means for the dimension of movement corresponding to the dimension of movement for said motor.

17. The positioner of claim 14 wherein said quantizing means has a dead-band including the zero force condition of said transducer, said quantizing means generating no units of electrical energy when the output of said transducer for the dimension of movement corresponding to the dimension of movement for said quantizing means is within said dead-band and said quantizing means generating units of electrical energy at a rate representative of the amount by which the output of said transducer exceeds said dead-band.

* * * * *